Jan. 18, 1927.
M. B. RYAN
1,614,900
CHAIN LINK AND METHOD OF MAKING THE SAME
Filed Sept. 2, 1922
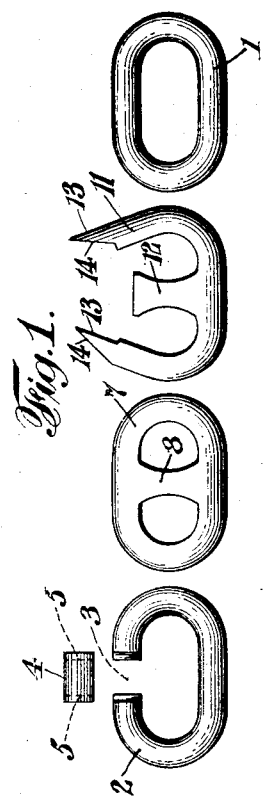
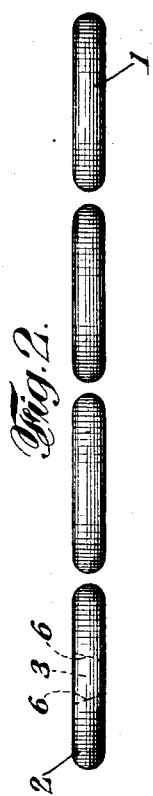
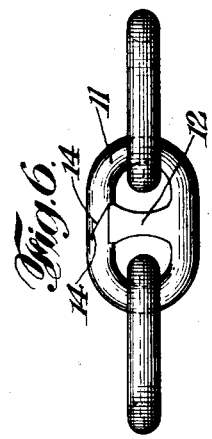
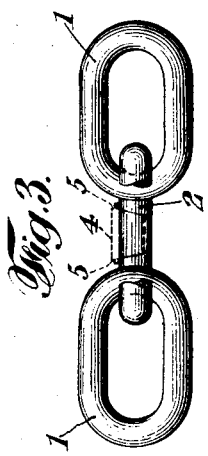
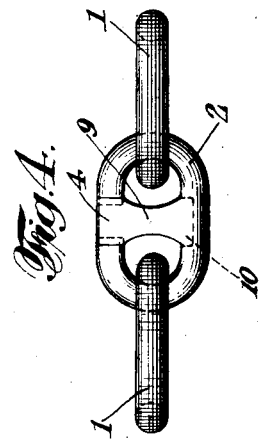
INVENTOR
Michael B. Ryan
BY
Prindle, Wright & Small ATTORNEYS Patented Jan. 18, 1927.

1,614,900

UNITED STATES PATENT OFFICE.

MICHAEL B. RYAN, OF MILFORD, CONNECTICUT.

CHAIN LINK AND METHOD OF MAKING THE SAME.

Application filed September 2, 1922. Serial No. 585,859.

The invention, while applicable in principle to links of all sizes, is intended particularly for the manufacture of heavy chains having links of stock up to four inches or more in diameter, such as are used as anchor chains for battleships and other similar purposes.

The invention has for an object to enable chains of the above type to be constructed of forged metal links, and to enable such links to be shaped and assembled with a minimum number of hand operations, and welded where necessary, in such a way as to avoid upsetting operations on the metal adjacent the weld, and to produce a weld which will be strong and readily made.

When applied to chains of the stud type, the invention further aims to provide links wherein the studs are of a high strength and so related to the body of the link as to facilitate the welding operations and reinforce the weld.

Further objects and advantages of the invention will be in part obvious and in part specifically pointed out in the description hereinafter contained, which, taken in connection with the accompanying drawings discloses certain preferred embodiments thereof; such embodiments, however, are to be considered as merely illustrative of its principle. In the drawings:

Fig. 1 is a plan view of certain types of links constructed in accordance with the invention.

Fig. 2 is a side view of the links shown in Fig. 1.

Fig. 3 is a plan view of the links above mentioned coupled together in the process of building up a chain.

Fig. 4 is a front elevation of the links shown in Fig. 3.

Fig. 5 is a perspective view showing detached one type of stud adapted to be used in making chains in accordance with the invention.

Fig. 6 is a view similar to Fig. 4, but showing a modied form of the invention.

Chain-making machines in present day use for various reasons have not been found suitable for the manufacture of chains having links over a certain diameter, about three-quarters of an inch, and consequently heavy chains have been made of cast links, or if the qualities of forged metal were desired, chains of large diameter have been shaped and welded by hand, involving obvious disadvantages and difficulties in obtaining welds of adequate strength. Furthermore, in order to obtain a weld of adequate strength, it has been considered necessary to upset the metal adjacent the surfaces to be welded, in order to apply pressure sufficient to squeeze the soft stock out of the weld and "follow up," by the pressure of the upsetting operation, the decrease in length of the metal adjacent the weld. It will be apparent that in the welding of heavy chain links, involving stock, for example, of three inch diameter, it is a difficult matter to squeeze or upset the hot metal around the weld, particularly against the resistance of the remainder of the link which is integral and is comparatively cold.

In accordance with the present invention, the necessity of such an upsetting operation is avoided by spacing apart the surfaces of the link which are to be welded and inserting between such surfaces during the welding operation, a plug or filler member adapted to be forced or wedged into the gap in such manner as to apply the necessary pressure at the weld. Thus the welding operation involves no distortion of the link as a whole, and the forcing of the plug member into proper position squeezes out the soft metal and scale from the surfaces to be welded, and also serves to prevent the entrance of air between the surfaces to be welded, and thereby avoids oxidation.

In cases where the invention is applied to chains of the stud type, it is possible to combine the above-mentioned plug or filler member with the stud, in such a way as to form a chain stronger both at the stud and at the weld, as will be described in greater length hereinafter.

Referring to the drawings, the invention may be applied to straight or plain type chains embodying integral links 1 which, prior to the welding operation, are connected together by means of other links constructed and welded in accordance with the invention. The links 1 may be formed by any desired method, as by casting but I prefer to shape them by drop forging or pressing operations.

A pair of these links 1 are then linked up with a further link 2 formed in a similar manner, but having a gap 3 therein to receive the plug or filler member above-mentioned after the links 1 have been inserted. This gap 3 readily may be made large enough to permit the links 1 to be engaged with link 2, without any bending or opening up of this latter link.

A plug or filler member 4 (shown detached in Fig. 1) and which is somewhat larger than the gap 3, is then forced into such gap and pressed against the adjacent surfaces of link 2 when the metal has been brought up to welding heat. The above operation effects a pressure between the engaging surfaces of the link 2 and plug 4, sufficient to squeeze out any soft stock and scale from the surfaces to be welded, and thus takes the place of the upsetting operation above referred to.

In the present embodiment of the invention the plug member 4 is provided with tapered or wedge-shaped sides 5 adapted to engage against similarly shaped surfaces 6 at the adjacent ends of link 2. Thus during the welding operation the plug 4 will first fill only partially the gap 3 (as illustrated by the dotted lines in Fig. 3), but as the pressure is applied to the plug, it will be forced home to the position illustrated by the full lines in Fig. 3. It will be understood that the heat for the above-described welding operation may be obtained by gas, electricity, coal or the like as desired, and that the pressure on the plug 4 may be applied either mechanically or by hand welding operations. In fact the invention makes it possible to manufacture chains in small shops without requiring expensive equipment, since links and plugs may be made up in quantities at some plant which is equipped for so doing, and supplied to chain makers who under such conditions need only the apparatus used in making the weld. The usual special shaping apparatus necessary in conjunction with making the weld, being eliminated.

The invention furthermore is particularly advantageous as applied to chains of the stud type. Fig. 1, for example, shows a solid link 7 having a stud 8 integral therewith, which link may be formed by any of the methods referred to in connection with the description of links 1. The link 7 may then be linked up with other links of the type corresponding to link 2, in which case the studs 9 for the link 2 (shown detached in Fig. 5) may be made integral with the plugs 4. In the embodiment shown in Figs. 4 and 5, the stud 9 is provided with a base 10 adapted to engage over and be welded to the solid side of link 2 after the links 7 have been linked up therewith but prior to the main welding operation above described. Thus the stud serves to reinforce the welded joints between plug 4 and the link.

Figs. 1 and 6 also illustrate the modification of the invention wherein the stud serves to reinforce welded joints of somewhat different construction. As is shown in Fig. 1, a link 11, having a stud 12 integral therewith, may be made according to any of the methods described in connection with links 1, 2 and 7, such link 11 having ends 13 which, as shown in Fig. 1, are opened sufficiently to enable another link to be inserted within the same. The ends 13 are then forced down on to the surface of stud 12, and the three members welded together as illustrated in Fig. 6. As shown, the ends 13 are provided with beveled surfaces 14 to facilitate the welding operation.

In making welds it is often found that the stock is not of the most desirable composition, having for example too much sulphur or too little silicon. In the use of the present invention it is possible to correct these conditions easily by employing a plug member which is of such analysis in regard to sulphur content or silicon content or the like as to neutralize the defective composition of the link or blank to which the plug is to be united.

While a specific embodiment of the invention has been described, it will be obvious that many changes may be made therein without departing from its principle, as defined in the following claim.

I claim:

The method of making a chain link of the stud type from a blank having a gap in one side thereof, which comprises securing the base of the stud in position at the solid side of said link, filling the gap in the blank with the remaining end of the stud and welding such last-mentioned end of the stud to the end of the blank at said gap.

In testimony that I claim the foregoing, I have hereunto set my hand this 29th day of August, 1922.

MICHAEL B. RYAN.